Oct. 29, 1935.  S. J. CLARIDGE  2,018,947
ELECTRICALLY HEATED STEERING WHEEL FOR VEHICLES AND OTHER PURPOSES
Filed March 1, 1933  3 Sheets-Sheet 1
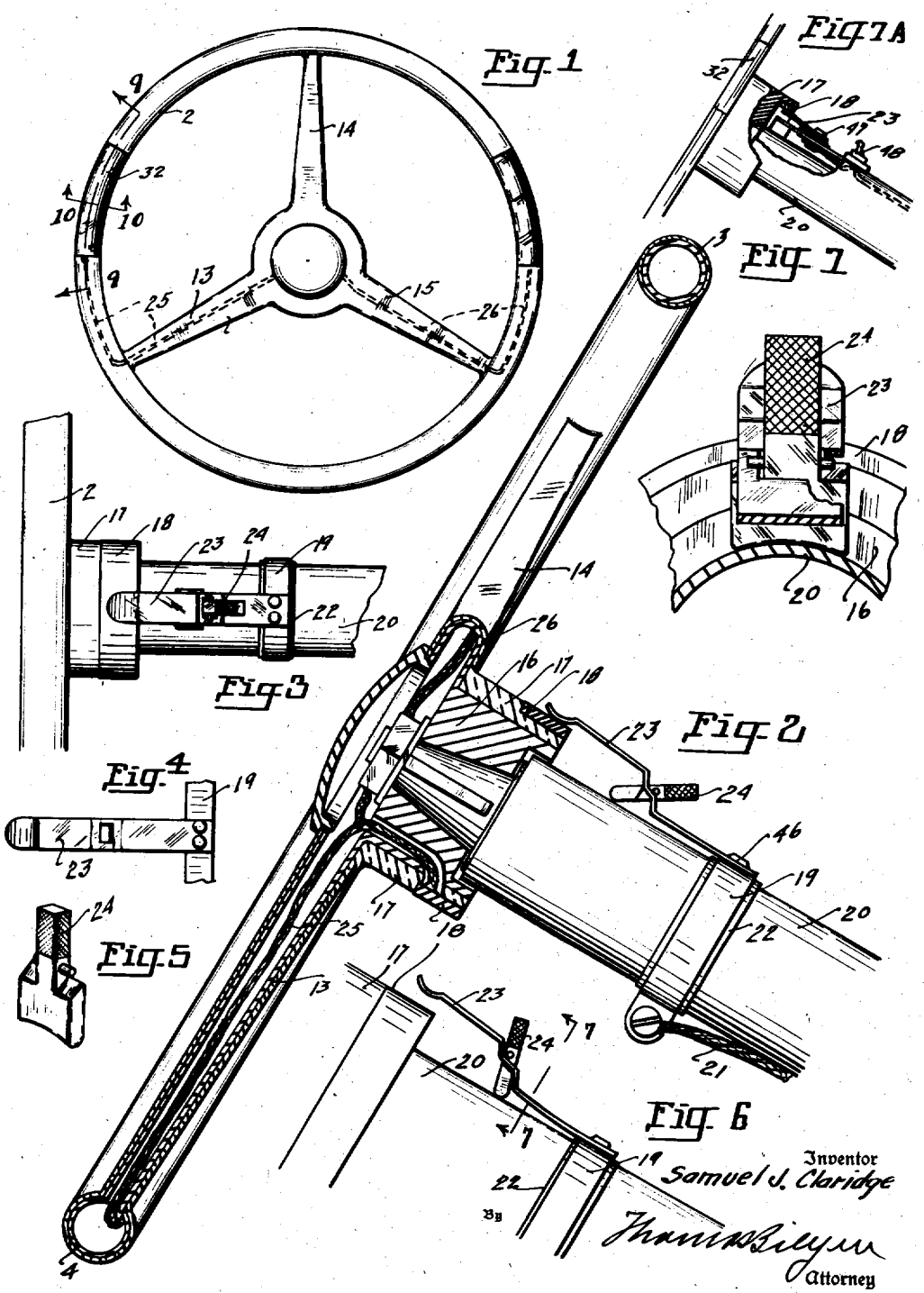
Inventor
Samuel J. Claridge
By Thomas Blynn
Attorney

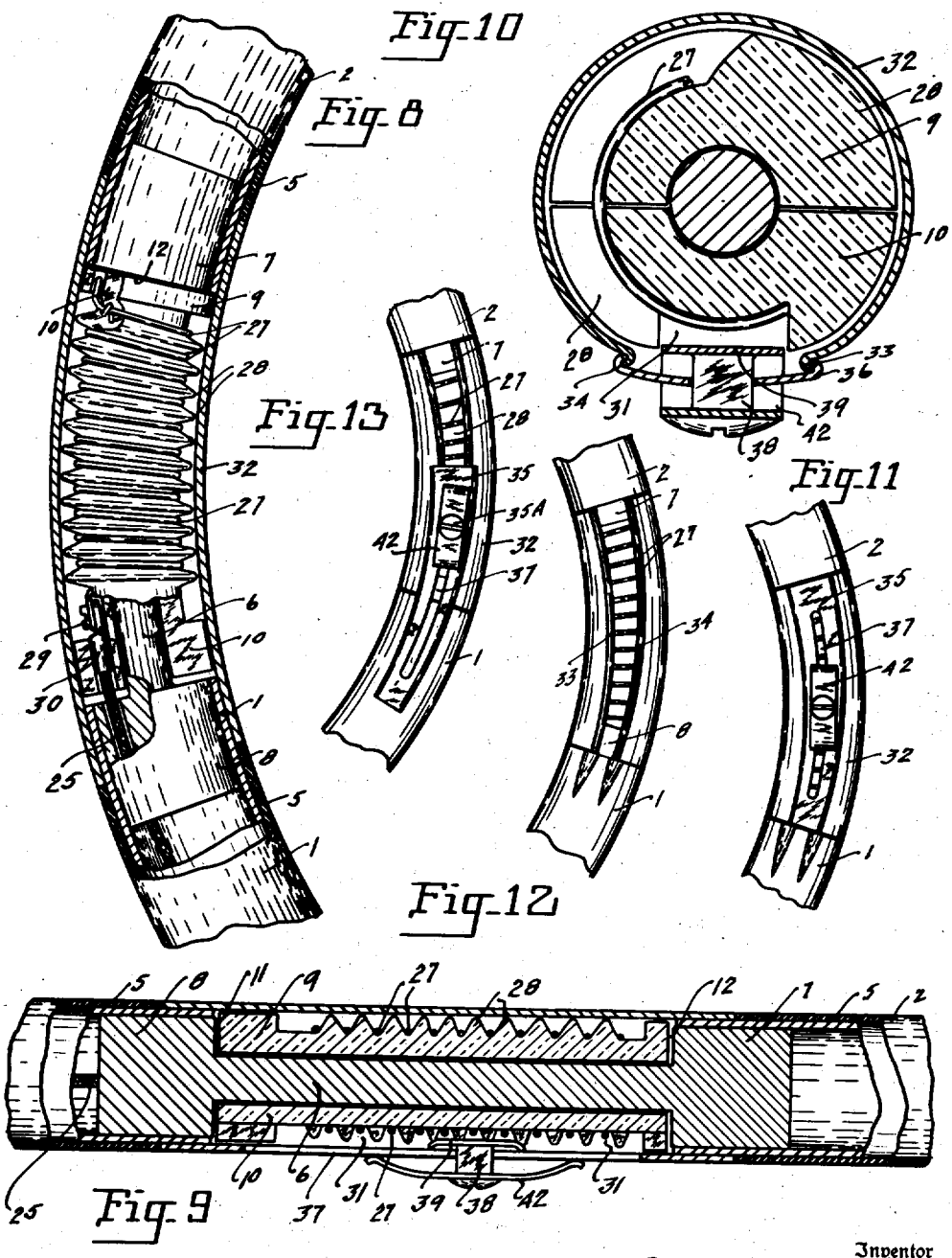
Oct. 29, 1935.    S. J. CLARIDGE    2,018,947
ELECTRICALLY HEATED STEERING WHEEL FOR VEHICLES AND OTHER PURPOSES
Filed March 1, 1933    3 Sheets-Sheet 2
Inventor
Samuel J. Claridge
By Thomas Bilyeu
Attorney Oct. 29, 1935.  S. J. CLARIDGE  2,018,947
ELECTRICALLY HEATED STEERING WHEEL FOR VEHICLES AND OTHER PURPOSES
Filed March 1, 1933   3 Sheets-Sheet 3
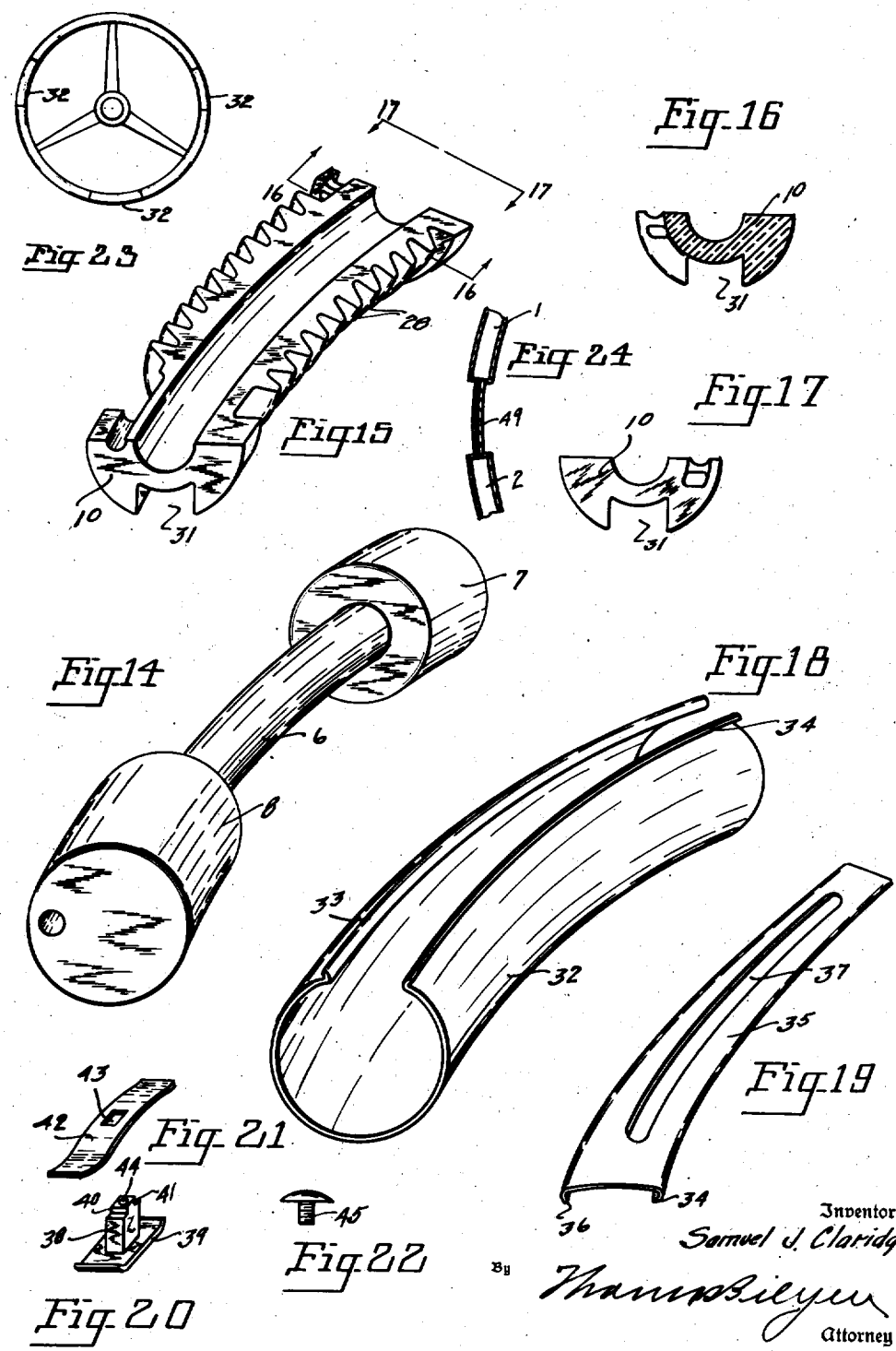

Patented Oct. 29, 1935

2,018,947

UNITED STATES PATENT OFFICE 2,018,947

ELECTRICALLY HEATED STEERING WHEEL FOR VEHICLES AND OTHER PURPOSES

Samuel J. Claridge, Portland, Oreg.

Application March 1, 1933, Serial No. 659,061

5 Claims. (Cl. 219—19)

The primary object of my invention is to provide a steering wheel for automobiles and the like, having heat radiating elements incorporated within the rim thereof, whereby the operator of the vehicle may enjoy the comfort of a warm steering wheel during periods of cold, inclement weather.

A still further object of my invention is to provide means incorporated with my device whereby the amount of heat radiated therefrom may be adjusted and controlled at the will of the operator.

A still further object of my invention is to provide means for warming the rim of a steering wheel that will be economical to manufacture, easy to inspect and service, and free from mechanical operating annoyances.

A still further object of my invention is to provide means whereby my device may be rendered inoperative during those seasons wherein a warm steering wheel is not desirable.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a plan view of one of my new and improved steering wheels.

Fig. 2 is a side view of one of my new and improved steering wheels partially in section and shown attached to the steering column of the motor vehicle.

Fig. 3 is a fragmentary sectional side view of the device illustrated in Figs. 1 and 2. This view is made to illustrate the switch connection that is secured to the steering column and that is adapted for contacting the hub of the steering wheel.

Fig. 4 is a plan view of the contact switch in which the hand manipulative lever is shown removed.

Fig. 5 is a perspective fragmentary side view of the hand manipulative switch lever.

Fig. 6 is a fragmentary side view of the steering column and of the hub of the steering wheel illustrating the contact switch points being opened through the action of the hand manipulative lever.

Fig. 7 is a fragmentary sectional end view of the contact switch taken on line 7—7 of Fig. 6, looking in the direction indicated.

Fig. 7A is a fragmentary sectional view of one of my new and improved steering wheels showing an alternative type of switching means.

Fig. 8 is a fragmentary sectional plan view of a part of the steering wheel showing one of my new and improved warming elements disposed therein.

Fig. 9 is a fragmentary sectional side view of a part of the steering wheel showing one of my new and improved warming elements disposed therein. This view is taken on line 9—9 of Fig. 1, looking in the direction indicated.

Fig. 10 is a sectional end view of the warming element taken on line 10—10 of Fig. 1, looking in the direction indicated.

Fig. 11 is an obverse plan view of the warmer disposed upon the steering wheel illustrating the mobile contact that is slidably and hand manipulatively disposed upon the stationary contact bar of the warmer.

Fig. 12 is an obverse plan view of the warmer disposed upon the steering wheel illustrating the warmer less the stationary bar.

Fig. 13 is an obverse plan view of the warmer disposed upon the steering wheel illustrating the stationary contact bar partially displaced.

Fig. 14 is a perspective end view of the core of the warmer shown removed from the assembly.

Fig. 15 is a perspective end view of one of the lower insulators that is adapted to the core illustrated in Fig. 14. This is the lower half only of the insulating core.

Fig. 16 is a sectional end view of the insulator taken on line 16—16 of Fig. 15 looking in the direction indicated.

Fig. 17 is an end view of the half core illustrated in Fig. 15. This view is taken on line 17—17 of Fig. 15 looking in the direction indicated.

Fig. 18 is a perspective obverse plan and end view of the jacket adapted to be disposed about the core assembly.

Fig. 19 is an obverse plan and end view of a contact bar closure adapted to lock the jacket in position.

Fig. 20 is a perspective end view of the mobile contact slipper.

Fig. 21 is a perspective end view of the spring that normally maintains the slipper out of contact.

Fig. 22 is a perspective side view of the screw that secures the shank of the slipper to the spring.

Fig. 23 is a plan view of a steering wheel illustrating more than two warming elements associated therewith.

Fig. 24 is a fragmentary sectional plan view of an alternative type of rim structure.

Like reference characters refer to like parts throughout their several views.

My invention relates to warmers for steering wheels, comprising a plurality of metal rim sections here shown as two in number at 1 and 2, covered with an insulating jacket as a rubber jacket 5. A metal core 6 is disposed between the spaced side ends of the metal rim. Heads 7 and 8 which precisely fit and engage the inner peripheral surface of the steering wheel rim terminate the core 6 about which split corrugated insulating cores 9 and 10 are disposed. The ends of the same are disposed adjacent the inner ends 11 and 12 of the respective heads of the core 6.

For those types of steering wheels having as a reinforcing member a steel torus, covered with a molded shell, exposed sections of said torus may be utilized in lieu of the core 6.

The steering wheel comprises a plurality of rim sections and spokes 13, 14, and 15. The rim sections and the spokes are made hollow in order that electric conductors may be carried therethrough. The rim has a hub 16 disposed central of its underside and an insulating sleeve 17 is disposed about the hub. A metallic electric contact ring 18 is disposed about the outer lower peripheral surface of the insulating sleeve. I place an electric terminal ring 19 about the outer surface of the steering column 20. Electric current is delivered to the ring 19 from a source of electric energy not here shown, as from a battery, through the electric conductor 21. The ring 19 is insulated from the steering column through the use of an insulating ring 22 disposed between the ring 19 and the outer surface of the steering column. A resilient contactor 23 conducts electric current from the ring 19 to the ring 18. The contactor 23 is normally in engagement with the ring 18. The same may be moved into and out of engagement through the use of the manually manipulative switch lever 24. Electric current is conducted from the ring 18 through the use of electric conductors 25 and 26 that lead from the ring 18 to the resistance heating elements 27 disposed within the corrugations 28 that form the outer peripheral surface of the insulating cores 9 and 10. Suitable terminal screws 29 are secured to electric terminals 30 of conductors 25 and 26, conducting electricity, from the conductors through the terminals 30 and the terminal screws 29 to which heating elements 27 are connected. An eye is disposed in an end of each of the insulating cores 10 and is adapted to receive the free end of the heating element thereabout disposed, said free end being thereupon looped back upon itself. A channel 31 as illustrated in Fig. 15 runs longitudinally of one side of the outer surface of one section of the insulated core. A radiating jacket 32 of like diameter to that of the rim sections is made precisely to engage between the ends of the rim sections at the point of the warmer and to engage and abut both its ends with that of the adjacent ends of the rim sections. The radiating jacket has lips 33 and 34 formed from the edges thereof. A contact bar closure 35 having engaging lips 36 and 37 is attachable to the lips 33 and 34 of the jacket 32 and is held in place thereupon by frictional engagement therewith. An elongated slit 37 is disposed in the broad side of the contact bar locking closure 35 and when the assembly is completed, the slit 37 is disposed in registry alignment with the channel 31 disposed within the insulating core 10. A manually slidable switch 38 is placed within the slit 37. A contacting slipper or shoe 39 is disposed upon one end of the mobile switch member 38. Shoulders 40 and 41 are formed upon the outer end of the switch member 38 and a spring yoke 42 is attachable to switch 38 through elongated hole 43 through which the restricted end 44 of the switch member is made to pass. Spring yoke 42 is so fashioned as to ride upon and engage the outer surface of contact ring closure 35 and the yoke 42 is secured to the switch member by any suitable fastening means as through the use of a button-headed screw 45. Through the action of spring yoke 42, the contact slipper 39 is normally held out of engagement with the heat element 27 as illustrated in Fig. 10. When it is desired to warm the radiating portions of the rim of the wheel, the switch lever 24 is drawn into the position as illustrated in Fig. 2 to conduct electric current to the bar 18 and upon pressing the spring yoke the shoe 39 is brought into contact with the resistance heating element wound about the insulated core. This contact is maintained for so long as the spring yoke 42 is depressed. Upon release of the spring yoke, the electric circuit is opened and radiation ceases. In this way heat is available as and where required, and unnecessary drains of electricity, through inadvertently leaving the circuit closed, are eliminated. The amount of heat developed depends upon the location of the spring yoke and slipper relative to the length of the heating element. When the full length of the heating coil is in circuit, the flow of current is least, due to the utilization of the total resistance of the coil, and the heat emission is therefore lowest. As the sliding shoe 39 is progressed toward the terminal 30, the amount of coil activated, and consequently the resistance, is reduced, resulting in increased current flow and heat output. It is, of course, necessary to terminate the progression toward terminal 30 of shoe 39 at a point short of that at which the current flow would be excessive. Any suitable automatic circuit interrupting means, or current limiting means, not here shown may be disposed in the conductor 21 to act as a safety device.

When it is desired to disassemble the radiating elements the fastening screw 45 is removed. Spring yoke 42 is removed. Contact bar closure 35 may then be removed from the radiating jacket 32 by longitudinal displacement and the jacket itself may then be removed from position, thereby exposing the entire insulating core and its electric connections for alteration and adjustment.

While I have shown in Fig. 1, a steering wheel having but two radiating sections, it is apparent that more than two may be installed if required. I therefore have shown in Fig. 23 a steering wheel having more than two radiating sections disposed therein. In this view I have shown three disposed equidistantly about the rim, but I do not wish to be limited to any specific number as two or more may be used.

A conventional switch 48 may be disposed upon the steering column in lieu of the switch heretofore described. Certain materials may be used for the construction of the wheel rim which might lend themselves to a modified form of rim structure as shown in Fig. 24, wherein structure 49 is integral with the wheel rim.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a steering wheel having a plurality of constricted sections disposed in the rim thereof, corrugated split insulating cores disposed about the constricted sections, resistance elements disposed about the corrugated split insulating cores, means for variably energizing the resistance elements, split jackets disposed about the constricted sections and spaced apart from the corrugated insulating cores, lips terminating the longitudinal edges of the split jackets, and closures adapted to engage and secure the split jackets.

2. In a device of the class described, the combination of a steering wheel comprising a plurality of rim segments spaced apart; a plurality of arcuate metal cores, each having heads disposed upon its opposite ends, disposed between and secured to the rim segments; a plurality of split corrugated and channelled arcuate insulating cores disposed one about each of the metal cores; a plurality of electric resistance heating elements disposed one about each of the insulating cores; a plurality of split jackets disposed one about each of the metal cores and spaced apart from the corrugated insulating cores; converging lips terminating the longitudinal edges of each of the split jackets; a plurality of contact bar closures adapted one to each of the split jackets to engage the lips thereof; and a plurality of electric switches adapted one to each of said bar closures, and adapted for limited longitudinal manipulation therealong and for slidably and intermittently contacting the heating element and for adjustably energizing the same.

3. In a device of the class described, the combination of a steering wheel comprising a plurality of rim segments spaced apart; a plurality of cores disposed between and secured to the rim segments, a plurality of electric resistance heating elements disposed one about each of the cores; a plurality of jackets disposed one about each of the cores and slidably manipulative switching means adapted to each of the heating elements for adjustably energizing the same.

4. In a device of the class described, the combination of a steering wheel comprising a rim segment constituting the major arc of a circle, a metal core having a head disposed upon each of its ends disposed between and secured to the ends of the rim section and completing the circle, a corrugated split insulating core adapted for disposition about the metal core, an electric resistance heating element adapted to be electrically energized disposed about the insulating core, a split jacket disposed about the metal core and spaced apart from the insulating core, converging lips terminating the longitudinal edges of the split jacket, a contact bar closure adapted to the lips of the split jacket, and means for energizing the heating element, said means including a switch adapted to the contact bar closure and for limited longitudinal mobility therealong and for intermittently contacting the heating element.

5. In a device of the class described, the combination of a steering wheel having a plurality of constricted sections disposed in the rim thereof, insulating means disposed about the constricted sections, resistance elements disposed about the insulating means, means for adjustably energizing the resistance elements, split jackets disposed about the constricted sections, lips terminating the longitudinal edges of the split jackets, and closures adapted to engage and secure the split jackets.

SAMUEL J. CLARIDGE.